(12) United States Patent
Yuan et al.

(10) Patent No.: US 11,662,248 B2
(45) Date of Patent: May 30, 2023

(54) VIBRATION SENSORS

(71) Applicant: SHENZHEN SHOKZ CO., LTD., Guangdong (CN)

(72) Inventors: Yongshuai Yuan, Shenzhen (CN); Wenjun Deng, Shenzhen (CN); Wenbing Zhou, Shenzhen (CN); Yujia Huang, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 17/814,533

(22) Filed: Jul. 25, 2022

(65) Prior Publication Data

US 2023/0046902 A1 Feb. 16, 2023

Related U.S. Application Data

(63) Continuation of application No. PCT/CN2021/112017, filed on Aug. 11, 2021.

(51) Int. Cl.
| | |
|---|---|
| *G01H 11/06* | (2006.01) |
| *H04R 7/04* | (2006.01) |
| *H04R 7/08* | (2006.01) |
| *G01H 11/08* | (2006.01) |
| *H04R 1/08* | (2006.01) |

(52) U.S. Cl.
CPC ............ *G01H 11/06* (2013.01); *G01H 11/08* (2013.01); *H04R 1/08* (2013.01); *H04R 7/04* (2013.01); *H04R 7/08* (2013.01)

(58) Field of Classification Search
CPC ............ H04R 7/08; H04R 7/04; G01H 11/08; G01H 11/06
See application file for complete search history.

(56) References Cited

U.S. PATENT DOCUMENTS

| | | | | |
|---|---|---|---|---|
| 5,940,347 A | * | 8/1999 | Raida ............... | G10K 11/24 367/138 |
| 2004/0140415 A1 | | 7/2004 | Watson | |
| 2009/0211838 A1 | * | 8/2009 | Bilan ............... | A61B 7/04 181/131 |

FOREIGN PATENT DOCUMENTS

| | | |
|---|---|---|
| CN | 208434106 U | 1/2019 |
| CN | 209314103 U | 8/2019 |

(Continued)

OTHER PUBLICATIONS

International Search Report in PCT/CN2021/112017 dated May 5, 2022, 8 pages.

(Continued)

*Primary Examiner* — Paul M. West
(74) *Attorney, Agent, or Firm* — Metis IP LLC

(57) ABSTRACT

The embodiments of the present disclosure may disclose a vibration sensor, including: an acoustic transducer and a vibration assembly connected with the acoustic transducer. The vibration assembly may be configured to transmit an external vibration signal to the acoustic transducer to generate an electric signal, the vibration assembly includes one or more groups of vibration diaphragms and mass blocks, and the mass blocks may be physically connected with the vibration diaphragms. The vibration assembly may be configured to make a sensitivity degree of the vibration sensor greater than a sensitivity degree of the acoustic transducer in one or more target frequency bands.

20 Claims, 6 Drawing Sheets

(56) References Cited

FOREIGN PATENT DOCUMENTS

| | | |
|---|---|---|
| CN | 209526879 U | 10/2019 |
| CN | 209659621 U | 11/2019 |
| CN | 212086490 U | 12/2020 |
| CN | 212785847 U | 3/2021 |
| CN | 213342678 U | 6/2021 |

OTHER PUBLICATIONS

Written Opinion in PCT/CN2021/112017 dated May 5, 2022, 10 pages.
The Extended European Search Report in European Application No. 21921636.3 dated Mar. 27, 2023, 9 pages.
Office Action in Russian Application No. 2022121511 dated Mar. 17, 2023, 22 pages.
Ki Woong Seong et al., A Vibro-Acoustic Hybrid Implantable Microphone for Middle Ear Hearing Aids and Cochlear Implants, Sensors, 2019, 14 pages.

\* cited by examiner

VIBRATION SENSORS

CROSS-REFERENCE TO RELATED APPLICATIONS

This application is a continuation of International Application No. PCT/CN2021/112017, filed on Aug. 11, 2021, the contents of which are hereby incorporated by reference.

TECHNICAL FIELD

The present disclosure relates to the field of sensors, and in particular, to a vibration sensor including a vibration assembly.

BACKGROUND

The vibration sensor is an energy transform device that transforms vibration signals into electrical signals. It may be used as a microphone (such as an air conduction microphone, a bone conduction microphone, etc.) or a monitoring device, etc. The vibration sensor may achieve the data like amplitudes and directions of vibrations and transform them into electrical signals or other forms required for further analysis and processing.

The present disclosure provides a vibration sensor whose sensitivity degree may be improved without any transducer.

SUMMARY

One of the embodiments of the present disclosure provides a vibration sensor, including: an acoustic transducer and a vibration assembly connected with the acoustic transducer. The vibration assembly may be configured to transmit an external vibration signal to the acoustic transducer to generate an electric signal, the vibration assembly includes one or more groups of vibration diaphragms and mass blocks, and the mass blocks may be physically connected with the vibration diaphragms. The vibration assembly may be configured to make a sensitivity degree of the vibration sensor greater than a sensitivity degree of the acoustic transducer in one or more target frequency bands.

In some embodiments, the one or more groups of vibration diaphragms and mass blocks may be arranged in order in a vibration direction of the vibration diaphragms. A distance between adjacent vibration diaphragms in the vibration assembly is no less than a maximum amplitude of the adjacent vibration diaphragms.

In some embodiments, a projection area of the mass blocks may be located within a projection area of the vibration diaphragms in a vibration direction of the vibration diaphragms.

In some embodiments, each group of the one or more groups of vibration diaphragms and mass blocks corresponds to one of the one or more different target frequency bands, so that the sensitivity degree of the vibration sensor may be greater than the sensitivity degree of the acoustic transducer in the corresponding target band.

In some embodiments, a resonance frequency of the one or more groups of vibration diaphragms and mass blocks may be smaller than a resonance frequency of the vibration sensor, so that the sensitivity degree of the vibration sensor may be greater than the sensitivity degree of the acoustic transducer in the one or more target frequency bands.

In some embodiments, a difference between the resonance frequency of the one or more groups of vibration diaphragms and mass blocks and the resonance frequency of the acoustic transducer may be in 1 kHz~10 kHz.

In some embodiments, resonance frequencies of at least two groups of the one or more groups of vibration diaphragms and mass blocks may be different.

In some embodiments, among the resonance frequencies of the groups of vibration diaphragms and mass blocks, a difference between two adjacent resonance frequencies may be smaller than 2 kHz.

In some embodiments, among the resonance frequencies of the groups of vibration diaphragms and mass blocks, a difference between two adjacent resonance frequencies may not be greater than 1 kHz.

In some embodiments, the resonance frequencies of the one and more groups of vibration diaphragms and mass blocks may be within 1 kHz and 10 kHz.

In some embodiments, resonance frequencies of the one and more groups of vibration diaphragms and mass blocks may be within 1 kHz and 5 kHz.

In some embodiments, resonance frequencies of the one and more groups of vibration diaphragms and mass blocks may be related with parameters of the vibration diaphragms and/or the mass blocks, the parameters include a modulus of a vibration diaphragm, a volume of a cavity formed between the acoustic transducer and the vibration diaphragm, a radius of a mass block, at least one of a height or a density of the mass block.

In some embodiments, the modulus of the vibration diaphragm may be within 1 Gpa-10 Gpa.

In some embodiments, the radius of the mass block may be within 500 μm-3 mm.

In some embodiments, a frequency curve of the vibration sensor under the one or more groups of vibration diaphragms and mass blocks may have a plurality of resonance peaks.

In some embodiments, the vibration assembly further includes a supporting structure configured to support the one or more groups of vibration diaphragms and mass blocks, the supporting structure may be physically connected with the acoustic transducer, the one or more groups of vibration diaphragms and mass blocks may be connected with the supporting structure.

In some embodiments, the supporting structure may be made of an airtight material.

In some embodiments, in a direction perpendicular to a surface of the vibration diaphragm connected with the mass block, a projected area of the mass block does not overlap with a projected area of the supporting structure.

In some embodiments, the mass blocks may be concentric with the vibration diaphragms.

In some embodiments, the diaphragms are constructed to let air through.

In some embodiments, among the vibration diaphragms, a vibration diaphragm furthest from the acoustic transducer may be constructed so that no air can pass through. In some embodiments, the vibration diaphragms may be provided with a through hole.

In some embodiments, the vibration diaphragms include a breathable diaphragm.

In some embodiments, the vibration diaphragms include at least one of polytetrafluoroethylene, expanded polytetrafluoroethylene, polyether sulfone, polyvinylidene fluoride, polypropylene, polyethylene terephthalate, nylon, pyroxylin, or mixed cellulose.

In some embodiments, the vibration assembly further includes a limit structure; the limit structure may be configured to make a distance between adjacent vibration diaphragms in the vibration assembly not less than the maximum amplitude of the adjacent vibration diaphragms.

In some embodiments, the acoustic transducer may be an air conduction microphone; resonance frequencies of the one or more target frequency bands may be configured to be 1 kHz~10 kHz lower than the resonance frequency of the air conduction microphone.

In some embodiments, the air conduction microphone includes a sound pickup hole, the one or more groups of vibration diaphragms and mass blocks may be configured in the sound pickup hole parallel to a radial section of the sound pickup hole; or, outside of the sound pickup hole.

In some embodiments, the mass blocks do not contact an inner wall of the sound pickup hole.

One embodiment of the present disclosure provides a sound input device, including a vibration sensor of any one of above.

BRIEF DESCRIPTION OF THE DRAWINGS

The present disclosure is further describable in terms of exemplary embodiments. These exemplary embodiments are describable in detail with reference to the drawings. These embodiments are non-limiting exemplary embodiments, in which like reference numerals represent similar structures throughout the several views of the drawings, and wherein.

DETAILED DESCRIPTION

Figure 1:
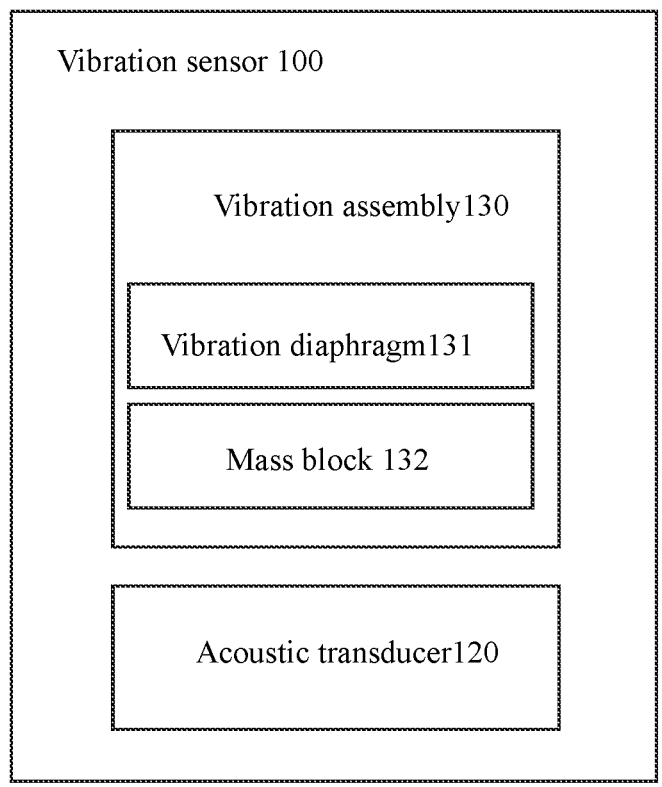
FIG. 1 is a schematic diagram illustrating the vibration sensor according to some embodiments of the present disclosure.

In order to illustrate technical solutions of the embodiments of the present disclosure, a brief introduction regarding the drawings used to describe the embodiments is provided below. Obviously, the drawings described below are merely some examples or embodiments of the present disclosure. Those having ordinary skills in the art, without further creative efforts, may apply the present disclosure to other similar scenarios according to these drawings. It should be understood that the exemplary embodiments are provided merely for better comprehension and application of the present disclosure by those skilled in the art, and not intended to limit the scope of the present disclosure. Unless obvious according to the context or illustrated specifically, the same numeral in the drawings refers to the same structure or operation.

As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or assemblies, but do not preclude the presence or addition of one or more other features, integers, steps, operations, elements, assemblies, and/or groups thereof. The term "based on" means "at least partly based on". The term "an embodiment" means "at least one embodiment"; the term "another embodiment" means "at least another embodiment". The related definitions of the other terms may be given in the following descriptions.

In some embodiments, when a vibration sensor is used as a microphone (e.g., an air conduction microphone, a bone conduction microphone, etc.), the device used to transform vibrations into electrical signals may include an acoustic transducer. Generally, a single acoustic transducer may have only one resonance peak, and the acoustic transducer only has a higher sensitivity degree near the frequency of the resonance peak. In some embodiments, to improve the sensitivity degree of the vibration sensor, a plurality of acoustic transducers with different resonance peaks may be configured to increase the frequency receiving range and sensitivity degree. However, increasing the number of acoustic transducers may lead to the increase of the volume and the production cost of the vibration sensor.

In view of this, the present disclosure involves a vibration sensor. Through the vibration assembly connected with the acoustic transducer, the sensitivity degree of the vibration sensor in a target frequency band may be greater than that of the acoustic transducer. The vibration sensor may be used to receive an external vibration signal and transform the vibration signal into an electrical signal that may reflect sound information. The external signal may include a mechanical vibration signal or an acoustic signal. The vibration assemblies may include one or more groups of vibration diaphragms and mass blocks, which are physically connected with each other. The vibration assemblies may be configured in one or more target frequency bands to make the sensitivity degree of the vibration sensor greater than the sensitivity degree of the acoustic transducer.

As shown in FIG. 1, a vibration sensor 100 may include an acoustic transducer 120 and a vibration assembly 130. In some embodiments, the acoustic transducer 120 may be connected with the vibration assembly 130, and the vibration assembly 130 may be configured to transfer the external vibration signals to the acoustic transducer to generate electrical signals. When vibration occurs in the external environment, the vibration assembly 130 may respond to the vibration and transmit the vibration signal to the acoustic transducer 120, and then the vibration signal may be transformed into an electrical signal by the acoustic transducer 120. The vibration sensor 100 may be applied to mobile devices, wearable devices, virtual reality devices, augmented reality devices, etc., or any combination thereof. In some embodiments, the mobile devices may include smartphones, tablets, personal digital assistants (PDA), game devices, navigation devices, etc., or any combinations thereof. In some embodiments, the wearable devices may include smart bracelets, headphones, hearing aids, smart helmets, smart watches, smart clothing, smart backpacks, smart accessories, etc., or any combination thereof. In some embodiments, the virtual reality devices and/or augmented reality devices may include virtual reality helmets, virtual reality glasses, virtual reality patches, augmented reality helmets, augmented reality glasses, augmented reality patches or any combinations thereof. For example, the virtual reality devices and/or augmented reality devices may include Google Glass, Oculus Rift, HoloLens, Gear VR, etc.

As shown in FIG. 1, the vibration assembly 130 may include a vibration diaphragm 131 and a mass block 132. The mass block 132 may be physically connected with the vibration diaphragm 131. The vibration assembly 130 may be configured to make the sensitivity degree of the vibration sensor 100 greater than the sensitivity degree of the acoustic transducer 120 in one or more target frequency bands.

In some embodiments, one or more groups of vibration diaphragms 131 and mass blocks 132 may be arranged in order along the vibration direction of the vibration diaphragms 131; and the distance between the adjacent vibration diaphragms 131 in the vibration assembly 130 may be no less than the maximum amplitude of the adjacent vibration diaphragms 131. In some embodiments, the diaphragms 131 may let air through.

In some embodiments, each of the groups of vibration diaphragms 131 and mass blocks 132 may correspond to one of the one or more different target frequency bands, so that the sensitivity degree of the vibration sensor 100 in the corresponding target frequency band may be greater than the sensitivity degree of the acoustic transducer 120. In some embodiments, under the one or more groups of mass blocks 132 and vibration diaphragms 131, the sensitivity degree of the vibration sensor 100 in the target frequency bands may increase by 2 dB to 30 dB compared with the sensitivity degree of the acoustic transducer 120. It should be noted that in some embodiments, after adding one or more groups of mass blocks 132 and vibration diaphragms 131, the sensitivity degree of the vibration sensor 100 may increase by over 30 dB compared with the sensitivity degree of the acoustic transducer 120 if the groups of mass blocks 132 and vibration diaphragms 131 share the same resonance peak.

In some embodiments, the mode of measuring the sensitivities of the vibration sensor 100 and the acoustic transducer 120 may include that: under the incentive of a fixed acceleration (such as 1 g, g is the gravity acceleration), the electrical signal may be collected (such as −30 dBV), then the sensitivity degree may be −30 dBV/g. In some embodiments, if the acoustic transducer 120 is an air conduction microphone, when measuring the sensitivity degree, the above incentive source may be replaced with sound pressure, that is, the sound pressure in a designated frequency band may be inputted as an incentive and the electrical signal of the collecting device may be measured.

In some embodiments, the frequency response curve of the vibration sensor 100 may have a plurality of resonance peaks in the effect of the one or more groups of the mass blocks 132 and vibration diaphragms 131.

In some embodiments, the resonance frequencies of the one and more groups of mass blocks 132 and vibration diaphragms 131 may be within 1 kHz~10 kHz. In some embodiments, the resonance frequencies of the one and more groups of mass blocks 132 and vibration diaphragms 131 may be within 1 kHz~5 kHz. In some embodiments, the resonance frequencies of at least two groups of mass blocks 132 and vibration diaphragms 131 in a plurality of groups of mass blocks 132 and vibration diaphragms 131 may be different. In some embodiments, the differences between two adjacent resonance frequencies among resonance frequencies of the plurality of groups of mass blocks 132 and vibration diaphragms 131 may be less than 2 kHz. The two adjacent vibration frequencies refer to two resonance frequencies with adjacent values of sizes. As the sensitivity degree corresponding to the frequency of the vibration sensor 100 outside of the resonance frequency will decrease rapidly, by controlling the resonance frequency difference, the vibration sensor 100 may have a relatively high sensitivity degree on a wider frequency band, while the sensitivity degree will not fluctuate much. In some embodiments, the difference between two adjacent resonance frequencies among resonance frequencies of the groups of mass blocks 132 and vibration diaphragms 131 may be no more than 1.5 kHz. In some embodiments, the difference between two adjacent resonance frequencies among the resonance frequencies of the groups of mass blocks 132 and vibration diaphragms 131 may be no more than 1 kHz, such as 500 Hz, 700 Hz or 800 Hz, etc. In some embodiments, the difference between two adjacent resonance frequencies among resonance frequencies of the groups of mass blocks 132 and vibration diaphragms 131 may be no more than 500 Hz.

In some embodiments, the vibration diaphragm 131 may include a breathable diaphragm. More descriptions of vibration assembly may be found in FIGS. 2-6.

Figure 2:
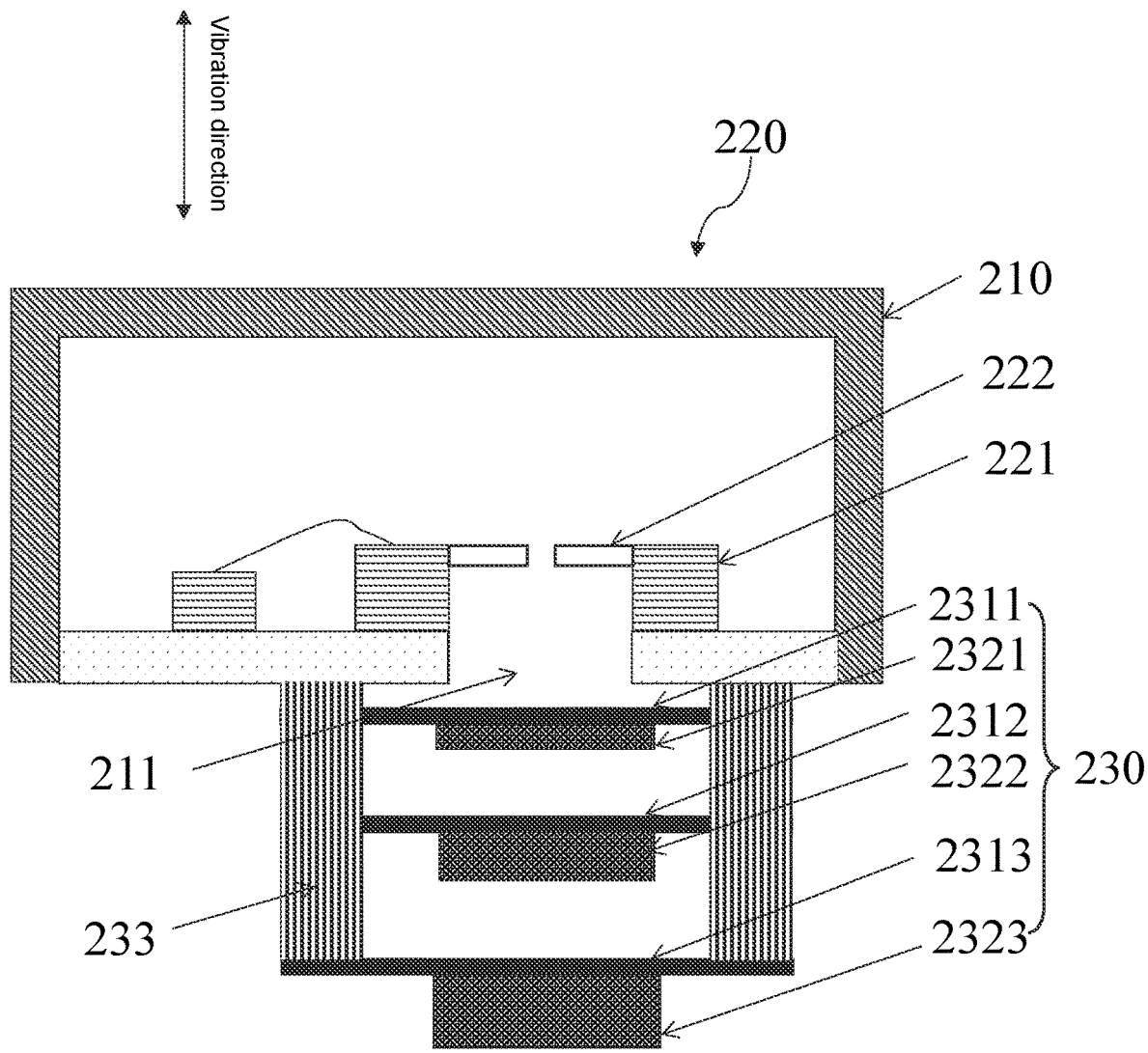
FIG. 2 is a schematic diagram illustrating the vibration sensor structure according to some embodiments of the present disclosure.

FIG. 2 is a schematic diagram illustrating the vibration sensor according to some embodiments of the present disclosure.

A vibration sensor 200 described in FIG. 2 may be an embodiment of the vibration sensor 100 in FIG. 1. In some embodiments, the vibration sensor 200 may include an acoustic transducer 220 and a vibration assembly 230. The acoustic transducer 220 may include an air conduction microphone. The air conduction microphone may acquire sound pressure change in a sound pickup area (such as at a sound pickup hole 211) and transform the sound pressure change into an electrical signal. To facilitate description, in the later description, the acoustic transducer may be described as the air conduction microphone. It should be noted that in some other embodiments, the acoustic transducer may further be in other forms such as a liquid microphone and a laser microphone.

Referring to FIG. 2, in some embodiments, the air conduction microphone may include a shell 210 and a sound pickup device 211. In some embodiments, the sound pickup device 211 may include a transducer in form of capacitive, piezoelectric type, etc., according to the principle of transduction, which is not limited in the present disclosure.

In some embodiments, the shape of the shell 210 may be a cuboid, an approximate cuboid, a cylinder, a sphere, or any other shape. The shell 210 may enclose an accommodating space, and the sound pickup device 211 may be arranged in the accommodating space. In some embodiments, the sound pickup device 211 and the shell 210 may be connected through a physical manner. Specifically, the physical connection manner may include welding, clamping, bonding, or integrated formation, etc., which is not limited in the present disclosure. In some embodiments, the shell 210 may be made of a material with a certain hardness, so that the shell 210 may protect the sound pickup device 211 and internal elements. In some embodiments, the material of the shell 210 may include, but not limited to one or more of metal, alloy material (such as aluminum alloy, chromium molybdenum steel, cashmere alloy, magnesium alloy, titanium alloy, magnesium lithium alloy, nickel alloy, etc.), glass fiber or carbon fiber, polymer material (e.g., acrylonitrile-butadiene-styrene cluster, polyvinyl chloride, polycarbonate, polypropylene, etc.).

In some embodiments, the shell 210 may be provided with a sound pickup hole 211 for pickup. In some embodiments, the vibration assembly 230 may be arranged close to the sound pickup hole 211 of the shell 210. In some embodiments, the one or more groups of vibration diaphragms and mass blocks may be located outside of the sound pickup hole. In some embodiments, the vibration assembly 230 may be connected with the shell structure through physical manners. Specifically, the physical connection manners may include welding, clamping, bonding, or integrated formation, etc., and no limitations will be made here. It should be noted that in some embodiments, the one or more groups of vibration diaphragms and mass blocks of a second generation may be configured in the sound pickup hole parallel to the radial section of the sound pickup hole. Specific information may be referred to in FIG. 5 and related descriptions later.

In some embodiments, when the vibration sensor 200 is used for air conduction sound pickup, when the external environment produces vibration (for example, sound waves), one or more groups of vibration diaphragms and the mass blocks located on the vibration diaphragms may vibrate in response to the vibrations of the external environment. As the vibration diaphragms let air through, the vibrations generated by the vibration diaphragms and the mass blocks together with the external vibration signals (for example, sound waves) may cause the internal pressure change (or air vibration) of the sound pickup hole 211, so that the vibration signals may be transmitted to a sound pickup device 221 through the sound pickup hole 211 and the vibration signals may be transformed into electrical signals, so as to realize the process of transforming vibration signals into electrical signals after being enhanced in one or more target frequency bands. A target frequency band may be the frequency range of the resonance frequency corresponding to a group of vibration diaphragm and mass block. For example, when the vibration sensor 200 is used as a microphone, the target frequency band may be 200 Hz~2 kHz. Specifically, in some embodiments, if the resonance frequency of the acoustic transducer is 2 kHz, the resonance frequency of the vibration assembly 230 may be configured to 1 kHz.

In some embodiments, when the vibration sensor 200 is used for bone conduction sound pickup, a conductive shell may be arranged on the outer side of the sound pickup hole 211, and the acoustic transducer 220 and the conductive shell may enclose an accommodating space, the one or more groups of vibration diaphragms and the mass blocks may be arranged in the accommodating space. In some embodiments, the vibration assembly (e.g., vibration parts) may be physically connected with the shell. When the vibration generates in external environment, the vibration may be received through the conductive shell and cause the vibration assembly to vibrate. The vibration of the vibration assembly may cause air vibration within the accommodating space, and the vibration of the vibration diaphragms and the mass blocks together with the vibration signals in the accommodating space may be transmitted to the sound pickup device 211 through the sound pickup hole 211.

As shown in FIG. 2, in some embodiments, the vibration sensor 200 may include three groups of vibration diaphragms and mass blocks. Specifically, the three groups of vibration diaphragms and mass blocks may have different resonance frequencies. Each group of vibration diaphragm and mass block may resonant under different frequencies of vibration in the external vibration signals, so that in the sound signals obtained by the vibration sensor 200, the sensitivity degree of the acoustic transducer 220 in three target frequency bands may be greater than the sensitivity degree of the acoustic transducer 220. It should be noted that in some embodiments, a plurality of groups of vibration diaphragms and mass blocks may have the same resonance frequency to greatly improve the sensitivity degree in the target frequency band. For example, when the vibration sensor 200 is used for testing mechanical vibrations between 5 kHz and 5.5 kHz, the resonance frequencies of a plurality group of vibration diaphragms and mass blocks may be configured as the values within the testing range (such as 5.3 kHz), so that the vibration sensor 200 may have higher sensitivity degree within the testing range compared to the situation where only one group of vibration diaphragms and mass blocks are arranged in the vibration sensor. It should be noted that the number of groups of the vibration diaphragms and mass blocks shown in FIG. 2 is just for the purpose of illustration, which should not limit the scope of the present disclosure. For example, the number of groups of vibration diaphragms and mass blocks may be one, two, or four, etc.

In some embodiments, when the vibration assembly 230 has a plurality of vibration diaphragms, the vibration diaphragm farthest from the acoustic transducer 220 may not let air through. As showed in FIG. 2, the third vibration diaphragm 2313 may not to let air through. Through this way of configuration, the third vibration diaphragm 2313 and the acoustic transducer 220 may form a closed space, which may better respond to vibration information. It should be noted that in some embodiments, the vibration diaphragm farthest from the acoustic transducer 220 may let air through. For example, when configuring a conductive shell on the outside of the sound pickup hole 211, the conductive shell and the acoustic transducer 220 may enclose an accommodating space, and the air in the space may respond to vibration information perfectly.

Figure 3:
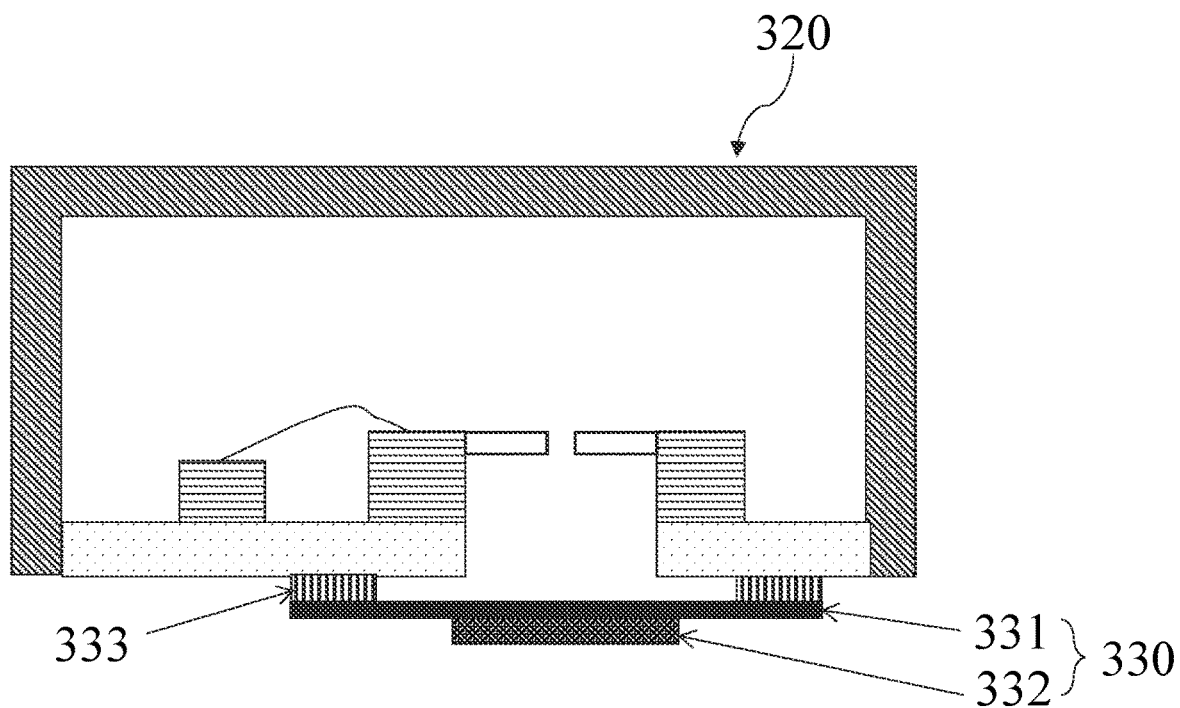
FIG. 3 is a schematic diagram illustrating the vibration sensor structure according to some embodiments of the present disclosure.

FIG. 3 is a schematic diagram illustrating a vibration sensor according to some embodiments of the present disclosure.

As shown in FIG. 3, in some embodiments, a vibration assembly 330 in a vibration sensor 300 may one group of vibration diaphragm 331 and mass block 332, that are connected with a sound sensor 320 through a supporting structure 333. Specifically, the mass block 332 may be physically connected with the vibration diaphragm 331, and the mass block 332 may be arranged on the outside of the vibration diaphragm 331. In some embodiments, the mass block 332 may resonant at the same time in response to the vibration of the external environment. The resonance generated by the vibration diaphragm 331 and the mass block 332 and the external vibration signal may be transmitted to the acoustic transducer 320, thereby strengthening the sensitivity degree near the resonance frequency of the vibration assembly 330, and realizing the process of transforming the vibration signal after being strengthened within the target frequency band into the electrical signal.

In some embodiments, as the vibration sensor 300 only includes one group of vibration diaphragm 331 and mass block 332, to ensure a better sound pickup effect, in some embodiments, the vibration diaphragm 331 may be impermeable.

In some embodiments, the resonance frequency of each group of vibration diaphragm and mass block may be related to the parameters of the vibration diaphragm and/or the mass block. The parameters may include the modulus of the vibration diaphragm, the volume of the cavity formed between the acoustic transducer and the vibration diaphragm, the radius of the mass block, the height of the mass block, and the density of the mass block, etc., or any combination thereof. Specifically, the mathematical relationship between the resonance frequency and the parameters may be referred to the related description of Equation 1 in the present disclosure.

Please referring back to FIG. 2, In the embodiment, the vibration assembly 230 may include a first vibration diaphragm 2311, a second vibration diaphragm 2312 and a third vibration diaphragm 2313 arranged in order along the vibration direction. The mass block may include a first mass block 2321, a second mass block 2322, and a third mass block 2323 arranged in order along the vibration direction, the first vibration diaphragm 2311 may be connected with the first mass block 2321, the second vibration diaphragm 2312 may be connected with the second mass block 2322, the third vibration diaphragm 2313 may be connected with the third mass block 2323. In some embodiments, the distance between any two adjacent vibration diaphragms among the first vibration diaphragm 2311, the second vibration diaphragm 2312, and the third vibrator 2313 may be no less than the maximum amplitude of the two adjacent vibration diaphragms, so that a vibration diaphragm does not interfere with the adjacent vibration diaphragm during vibration, which affects the transmission effect of the vibration signals. In some embodiments, when the vibration assembly 230 includes a plurality of groups of vibration diaphragms and mass blocks, the vibration diaphragms may be perpendicular to the vibration direction of the vibration diaphragms. In some embodiments, the distances between adjacent vibration diaphragms may be the same or different. In some embodiments, a vibration diaphragm may form a plurality of cavities with the adjacent vibration diaphragms, the plurality of cavities and the vibration diaphragm may accommodate air and enable the vibration diaphragm to vibrate within the plurality of cavities.

In some embodiments, the vibration assembly 230 may further include a limit structure (not shown in the figure), which is configured to ensure that the distance between the adjacent vibration diaphragms in the vibration assembly is no less than the maximum amplitude of the two adjacent vibration diaphragms. In some embodiments, the limit structure may be connected with the edge of one of the two adjacent vibration diaphragms, and by controlling the damping of the limit structure, the limit structure will not interfere the vibration of the diaphragm.

In some embodiments, a plurality of mass blocks and one single vibration diaphragm may be included in one single group of mass blocks and vibration diaphragms, and the plurality of mass blocks may be arranged on both sides of the vibration diaphragm. Exemplarily, assuming that a group of vibration assemblies include two mass blocks, the two mass blocks may be configured symmetrically on two sides of the vibration diaphragm. In some embodiments, the mass blocks in a plurality of groups of vibration assemblies 230 may be located on the same side of the vibration diaphragms. The mass blocks may be arranged on the outer sides or inner sides of the vibration diaphragms, wherein the side of the vibration diaphragm close to the acoustic transducer 220 is the inner side, and the side away from the acoustic transducer 220 is the outer side. It should be noted that in some embodiments, the mass blocks in a plurality of groups of vibration assemblies may be located on different sides of the vibration diaphragm, for example, the first mass block 1321 and the second mass block 2322 may be located on the outer side of the corresponding vibration diaphragm, while the third mass block 2323 may be located on the inner side of the corresponding vibration diaphragm.

In some embodiments, the vibration diaphragm may be structured as the thin diaphragm-like structure that lets air through. In some embodiments, the vibration diaphragm may be a breathable diaphragm. The vibration diaphragm may be configured to allow air to pass through, so that the vibration signals may make the vibration assembly 230 vibrate, and the vibration signals may further penetrate the breathable diaphragm and be received by the acoustic transducer, thereby increasing the sensitivity degree in the target frequency band. In some embodiments, the material of the vibration diaphragm may be the material that is able to generate elastic deformation within a certain range. Specifically, the diaphragm may at least be made of one or more of the following materials: PTFE (polytetrafluoroethylene), EPTFE (expanded polytetrafluoroethylene), PES (polyether sulfone), PVDF (polyvinylidene fluoride), PP (polypropylene), PETE (polyethylene terephthalate), nylon, NC (nitrocellulose), and MCE (mixed cellulose), etc., or a combination thereof. In some embodiments, the vibration diaphragm and the mass block may be connected through clamping, bonding, or integrated formation, etc., and no limitations will be made here. In some embodiments, the thickness of the vibration diaphragm may be in a range of 0.05 µm~100 µm. Specifically, the thickness of the vibration diaphragm may be related to the material of the vibration. For example, if the vibration diaphragm includes EPTFE (expended polytetrafluoroethylene), the thickness of the vibration diaphragm may be in a range of 0.5 µm~100 µm. Preferably, the thickness of the EPTFE diaphragm may be in a range of 1 µm~10 µm, such as 2 µm, 5 µm, 7 µm, etc. In some embodiments, preferably, the minimum permeability of the EPTFE diaphragm may be not less than 10L/HR to ensure good breathability. At the same time, the EPTFE diaphragm further provides a certain degree of waterproof performance to protect internal assemblies. In some embodiments, other breathable materials whose modulus is 1 GPa~10 GPa, or is 1/10 or 1% of the modulus of a sensitive element 222 in the acoustic transducer 220 may be chosen as well, which is not listed here. A sensitive element refers to a device used to receive vibration signals in the acoustic transducer 220. In some embodiments, the materials and sizes of a plurality of vibration diaphragms in the vibration assembly 230 may be different or the same. For example, the first vibration diaphragm 2311 may be made of nylon, and the second vibration diaphragm 2312 may be made of EPTFE materials. The radius of the third vibration diaphragm 2313 may be larger than the radius of the first vibration diaphragm 2311 and the radius of the second vibration diaphragm 2312.

In some embodiments, when the vibration diaphragm is configured to be air proof, the vibration diaphragm may be a polymer film, such as a film made of polyurethanes, epoxies, acrylics, etc., or the vibration diaphragm may be a metal film, such as a film made of copper, aluminum, tin, or other alloys and a composite film. In some embodiments, the vibration diaphragm may further be obtained through processing the above breathable diaphragm (such as covering the breathing holes).

In some embodiments, the vibration diaphragm may be a thin film with through holes. Specifically, the aperture of the through holes may be in a range of 0.01 µm~10 µm. Preferably, the aperture of the through holes may be in a range of 0.1 µm~5 µm, such as 0.2 µm, 0.5 µm, 0.8 µm, 1 µm, 2 µm, etc. In some embodiments, the diameters of the through holes on a plurality of vibration diaphragms of the vibration assembly 230 may be the same or different, and the diameters of the through holes on a single vibration diaphragm may be the same or different as well. In some embodiments, the aperture of the through holes may be greater than 5 µm. When the aperture is greater than 5 µm, other materials (such as silicone, etc.) may be configured on the vibration diaphragm to cover part of the through hole or a part of the through hole under the premise of not affecting breathability.

In some embodiments, the material of the mass blocks may be one or more of copper, tin, or other alloys and a composite material thereof. In some embodiments, the vibration sensor 200 may be applied to the design of an MEMS device. In the process of the MEMS device, the vibration diaphragm may be made of a single-layer material along the thickness direction of the vibration diaphragm, such as Si, SiO2, SiNx, SiC, etc., or may be made of a dual-layer or more multiple-layer composite material, such as Si/SiO2, SiO2/Si, Si/SiNx, SiNx/Si/SiO2, etc. A mass block may be made of a single-layer material, such as Si, Cu, etc., or the mass block may be made of a dual-layer or multi-layer composite material, such as Si/SiO2, SiO2/Si, Si/SiNx, SiNx/Si/SiO2, etc.

In some embodiments, the vibration assembly 230 may further include a supporting structure 233, which is used to support one or more groups of vibration diaphragms and mass blocks. The supporting structure 233 may be physically connected with the acoustic transducer 220 (for example, the shell 210), and one or more groups of vibration diaphragms and mass blocks may be connected with the supporting structure 233. Specifically, the supporting structure 233 and the shell 210 may be physically connected. The physical connection manner may include clamping, bonding, or integrated formation, etc. In some embodiments, preferably, the supporting structure 233 and the shell 210 may be connected through bonding, and the bonding material may include, but not limited to epoxy glue and silica gel.

In some embodiments, the vibration diaphragms may further be connected with the supporting structure 233 to achieve fixed supporting to control the distances between the adjacent vibration diaphragms, thereby ensuring the transmission effect of the vibration signals.

Figure 4:
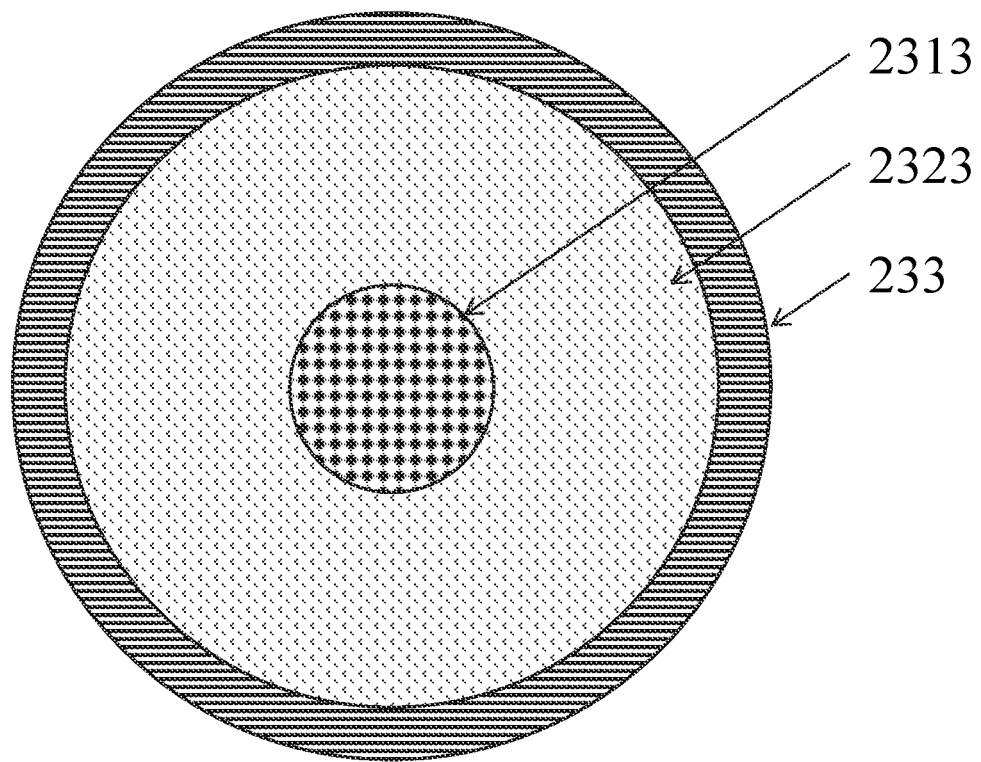
FIG. 4 is a schematic diagram illustrating the vibration assembly according to some embodiments of the present disclosure.

FIG. 4 is a schematic diagram illustrating a vibration assembly according to some embodiments of the present disclosure.

Referring to FIG. 2 and FIG. 4, in some embodiments, one or more groups of vibration diaphragms and mass blocks of the vibration assembly may be located in a space surrounded by the supporting structure 233 and physically connected with the supporting structure 233. Specifically, the physical connection manner may include clamping, bonding, etc. Preferably, the physical connection manner may include bonding, and the bonding material may include but not limited to epoxy glue and silica gel. In some embodiments, the supporting structure 233 may be in a hollow tubular structure with openings at both ends, and the cross-section of the tubular structure may be a rectangle, a triangle, a circle, or other shapes. In some embodiments, the cross-sectional areas of the tubular structure at different locations may be the same, or may not be the same. For example, the end of the tubular structure near the acoustic transducer 220 may be with a larger cross-sectional area. In some embodiments, one group of vibration diaphragm and mass blocks in the vibration assembly 230 may be installed at the opening of the supporting structure 233.

In some embodiments, the vibration diaphragm may be arranged on the inner wall of the supporting structure 233 or embedded in the supporting structure 233. In some embodiments, the vibration diaphragm may vibrate in the space inside the supporting structure 233 and may completely block the opening end of the supporting structure, that is, the area of the vibration diaphragm may be greater than or equal to the area of the opening of supporting structure, such that the air vibration (e.g., sound waves) in the external environment may be able to pass through the vibration diaphragm as completely as possible, and then the sound pickup device 221 may be able to pick up the vibrations, thereby effectively improving the sound pickup quality.

In some embodiments, the supporting structure 233 may be made of an airtight material. In the transmission process of the vibration signals in the air, the supporting structure 233 made of an airtight material may cause changes of sound pressure (or air vibration) within the supporting structure 233, so that the internal vibration signals of the supporting structure 233 may be transmitted to the acoustic transducer 220 through the sound pickup hole 211 and not escape out through the supporting structure 233, thereby ensuring the strength of the sound pressure and improving the transmission effect. In some embodiments, the supporting structure 233 may include but not limited to one or more of metal, an alloy material (such as aluminum alloy, chromium molybdenum steel, cashmere alloy, magnesium alloy, titanium alloy, magnesium lithium alloy, nickel alloy, etc.), hard plastic, bubble, foam, etc.

Referring to FIG. 4, in some embodiments, in the vibration direction of the vibration diaphragm, the projection area of the mass block may be located in the projection area of the vibration diaphragm, that is, in the parallel direction of the surface of the mass block connected with the vibration diaphragm (that is, perpendicular to the vibration direction), the cross-section area of the mass block may be less than the cross-section area of the vibration diaphragm. Combined with FIG. 2, for example, the first mass block 2321 may be located within the projection area of the first vibration diaphragm 2311; the second mass block 2322 may be located within the projection area of the second vibration diaphragm 2312, and the third mass block 2323 may be located within the projection area of the third vibration diaphragm 2313. By ensuring that the cross-section area of the mass block is smaller than the cross-section area of the vibration diaphragm, the mass block may not interfere with the vibration of the vibration diaphragm.

In some embodiments, in the direction perpendicular to the surface of the mass block connected with the vibration diaphragm (that is, perpendicular to the vibration direction), the projection area of the mass block and the projection area of the supporting structure may not overlap, thereby avoiding the vibrations of the vibration diaphragm and the mass block being restricted by the supporting structure 233.

In some embodiments, the shape of the vibration diaphragm may include circle, rectangle, triangle, or irregular shapes, etc. In some embodiments, the shape of the vibration diaphragm may be configured according to the shapes of the supporting structure or a tube, which is not limited in the present disclosure. In some embodiments, the shape of the mass block may be a cylinder, a truncated cone, a circular cone, a cube, a triangle, etc., and the size and material of the mass block may be found elsewhere in the present disclosure, which is not limited in the present disclosure.

In some embodiments, when the mass block or vibration diaphragm have a circular outer outline, the mass block may be placed concentrically with the vibration diaphragm. When the mass block concentrically placed with the vibration diaphragm is vibrating, the kinetic energy may be evenly scattered on the vibration diaphragm, so that the vibration diaphragm may better respond to the vibration. In some embodiments, the mass block may be configured in other positions of the vibration diaphragm, such as an eccentric position. The eccentric position refers to that the mass block is not configured concentrically with the vibration diaphragm. Preferably, the eccentric distance between the mass block and the vibration diaphragm may be not exceed 50 μm. In some embodiments, the resonance frequencies of one or more groups of vibration diaphragms and mass blocks may be less than the resonance frequency of the acoustic transducer, so that the sensitivity degree of the vibration sensor in one or more target frequency bands may be greater than the sensitivity degree of the acoustic transducer. In some embodiments, the relationship between the resonance frequency and the sensitivity degree of the vibration diaphragm and the mass block and the acoustic transducer may be referred to the frequency resonance curve diagram of the vibration sensor in FIG. 5.

Specifically, in some embodiments, the resonance frequencies of a plurality of groups of mass blocks and vibration diaphragms may be1 kHz~10 kHz, such as 2 kHz, 3 kHz, 5 kHz, or 7.5 kHz, etc., lower than the resonance frequency of the acoustic transducer so that the overall sensitivity degree of the vibration sensor may be improved. In some embodiments, when the acoustic transducer is the air conduction microphone in the above embodiments, the plurality of groups of mass blocks and vibration diaphragms may be configured to make the sensitivity degree of the vibration sensor greater than the sensitivity degree of the acoustic transducer in one or more target frequency bands. The resonance frequencies of one or more target bands may be configured to be 1 kHz~10 kHz lower than the resonance frequency of the air conduction microphone. Specifically, the resonance frequencies of the plurality of groups of mass blocks and vibration diaphragms may be 1.5 kHz, 2 kHz, 3 kHz, or 5 kHz, etc., lower than the resonance frequency of the air conduction microphone.

Figure 5:
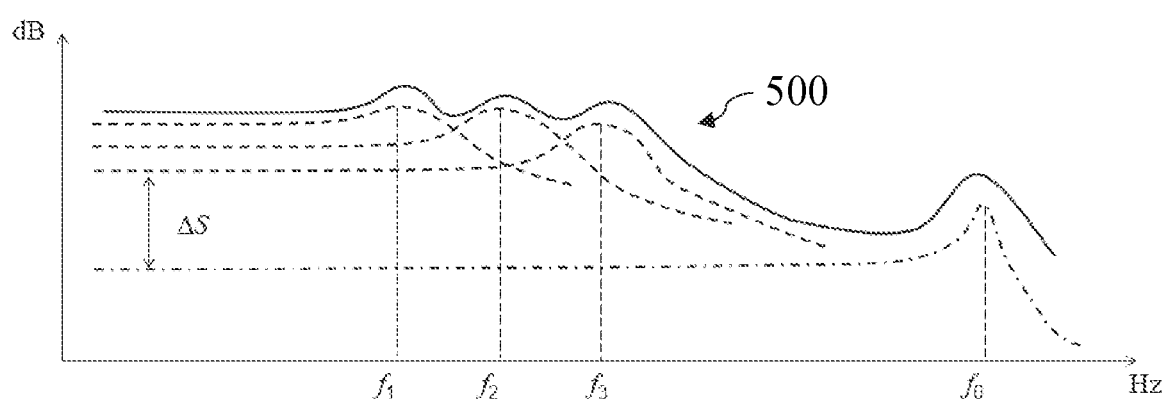
FIG. 5 is a frequency response curve diagram of the vibration sensor according to some embodiments of the present disclosure.

FIG. 5 is diagram illustrating a frequency response curve of a vibration sensor according to some embodiments of the present disclosure.

As shown in FIG. 5, in some embodiments, the frequency response curve of a vibration sensor in the effect of one or more groups of vibration diaphragms and mass blocks may have a plurality of resonance peaks. In the figure, $f_1$, $f_2$ and $f_3$ respectively corresponds to the resonance peaks of groups of mass blocks and vibration diaphragms, $f_0$ denotes the resonance peak of the acoustic transducer. In some embodiments, each of the one or more groups of vibration diaphragms and mass blocks corresponds to a target frequency band of the one or more different target frequency bands, causing the sensitivity degree of the vibration sensor in the corresponding target frequency band to be greater than the sensitivity degree of the acoustic transducer. In the figure, the full line is a frequency response curve 500 of the vibration sensor after adding groups of mass blocks and vibration diaphragms. After adding one or more groups of vibration diaphragms and mass blocks whose resonant frequencies are less than the resonant frequency of the acoustic transducer, one or more resonance peaks of the vibration sensor may be added accordingly.

It may be seen from the figure that the frequency response curve 500 of the vibration sensor has 4 resonance peaks and the sensitivity degree of the vibration sensor has at least increased by ΔS compared to the acoustic transducer. At the same time, the frequency response curve of the acoustic transducer (i.e., the curve where the resonance peak locates) further shows that the vibration sensor has a higher sensitivity degree in the frequency band $f_1$~$f_3$ and the width of the frequency band of the vibration sensor with a high sensitivity degree is increased by the vibration diaphragms and the mass blocks, which allows the vibration sensor to receive vibration signals more sensitively within a larger frequency range. Compared to the manner of adding a plurality of groups of acoustic transducers with different resonance peaks to increase the range of receiving frequency, the manner of adding vibration diaphragms and mass blocks may reduce the overall volume of the device, reduce the cost, and make the device more powerful on the basis of higher integration.

Exemplarily, the 3 groups of vibration diaphragms and mass blocks in FIG. 4 may be taken as an example. The corresponding resonance frequencies of the resonance peaks of the 3 groups of vibration diaphragms $f_1$, $f_2$ and $f_3$ may be 1.5 kHz, 2 kHz, and 2.5 kHz. In some embodiments, through this setting, the vibration sensor may achieve better sound pickup ability, especially, may better achieve sound information in the corresponding frequency band of voices.

In some embodiments, the resonance frequencies of one or more groups of vibration diaphragms and mass blocks may be related to the parameters of the vibration diaphragms and/or mass blocks. The parameters may include the modulus of the vibration diaphragm, the volume of the cavity formed between the vibration diaphragm and the mass block, the radius of the mass block, at least one of the height or the density of the mass block. In some embodiments, the relationship between the resonance frequency and the sensitivity degree of the plurality of groups of vibration diaphragms and mass blocks may be expressed as:

$$(S,f) = {}_9(K_{film}, K_{foam}, V_{cavity}, R_m, h_m, \rho_m) \quad (1)$$

where, S denotes the sensitivity degree of the vibration sensor after configuring the vibration assembly, f denotes the resonance frequency of the vibration assembly, $K_{film}$ denotes the rigidity of the vibration diaphragm, $K_{foam}$ denotes the rigidity of the supporting structure, $V_{cavity}$ denotes the volume of the cavity, $R_m$ denotes the radius of the mass block, $h_m$ denotes the height of the mass block, $r_m$ denotes the density of the mass block. The cavity volume is the volume of space formed between a sensitive element 222 on the sound pickup device 221 and the vibration diaphragm of the vibration assembly 230 closest to the sensitive element 222 (such as the first vibration diaphragm 2311 in FIG. 2).

Specifically, in some embodiments, the sensitivity degree S decreases with the increase of the rigidity of the diaphragm $K_{film}$, decreases with the increase of rigidity of the supporting structure. With the increase of the cavity volume $V_{cavity}$, S increases first and decreases later; with the increase of the radius of the mass blocks μm, S increases first and decreases later; moreover, S decreases with the increase of the height of the mass block $h_m$ and the increase of the density of the mass block $r_m$. In some embodiments, the value of the sensitivity degree and the resonance frequency may be adjusted by controlling the rigidity of the vibration diaphragm, the volume of the cavity, and the material and size of the mass block.

Figure 6:
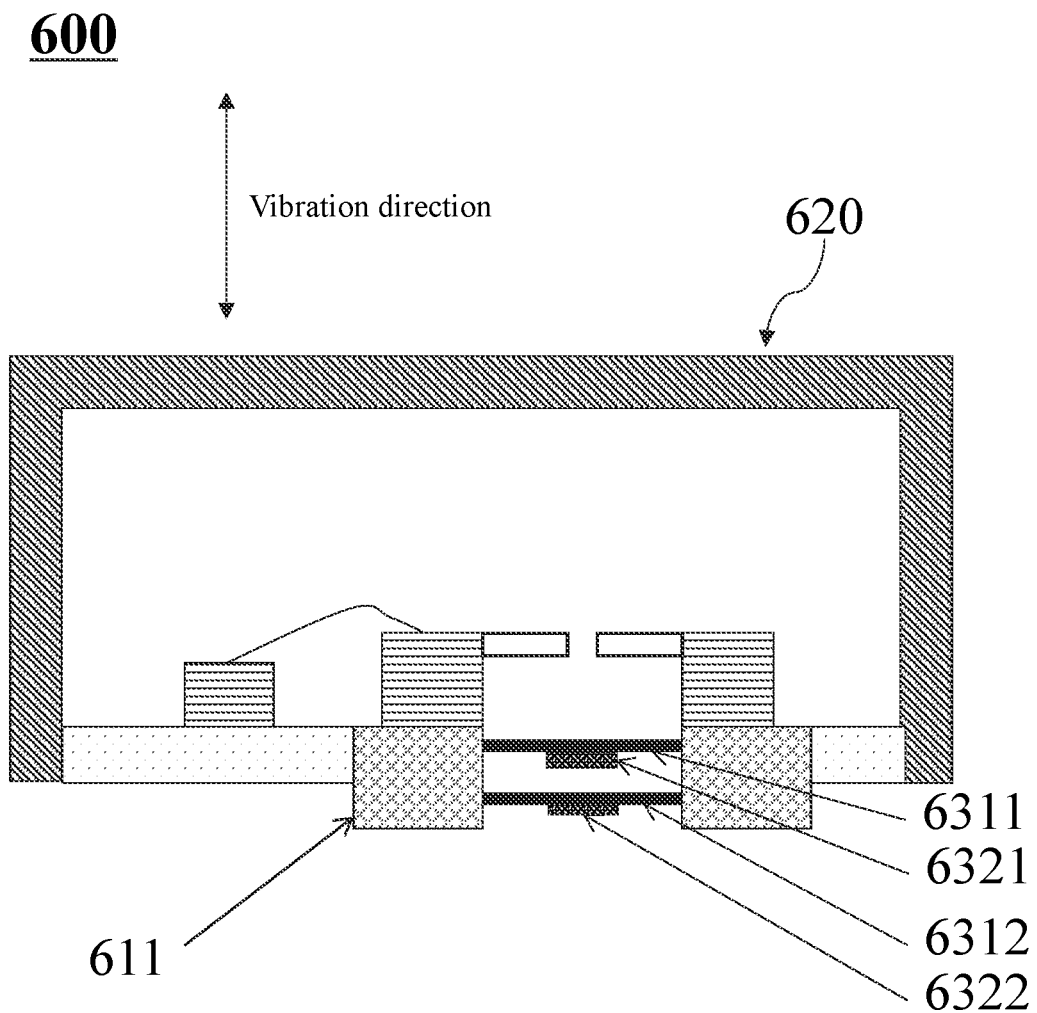
FIG. 6 is a schematic diagram illustrating the vibration sensor structure according to some embodiments of the present disclosure.

FIG. 6 is a schematic diagram illustrating a vibration sensor according to some embodiments of the present disclosure.

In some embodiments, one or more groups of vibration diaphragms and mass blocks of a vibration sensor 600 may be arranged parallel to the radial section (i.e., perpendicular to the vibration direction) in the sound pickup hole. As shown in FIG. 6, in some embodiments, a tube 611 may be set at the sound pickup hole. The vibration diaphragm and the mass block may include a first vibration diaphragm 6311, a second vibration diaphragm 6212, and a first mass block 6321, a second mass block 6322 arranged parallel with the redial section of the sound pickup hole in the sound pickup hole. In some embodiments, the tube 611 may be made of an airtight material, and the role of the tube 611 may be similar to the supporting structure 233 in the vibration sensor 200. When calculating the sensitivity degree and the resonance frequency of the vibration assembly, the rigidity of the material of the tube 611 may be taken as the rigidity of the supporting structure $K_{foam}$. In some embodiments, to ensure the free vibration of the mass block, the mass block does not contact the inner wall of the sound pickup hole or the tube 611. It should be noted that configuring the tube 611 is just a specific embodiment, and it does not limit the scope of the present disclosure. For example, in some embodiments, no tube 611 may be configured. One or more groups of vibration diaphragms and mass blocks may be directly connected with the sound pickup hole, or the supporting structure may be configured in the sound pickup hole, and support one or more groups of vibration diaphragms and mass blocks.

In some embodiments, the first mass block 6321 and the second mass block 6322 may vibrate in response to the vibration of the external environment and generate resonance at the same time. The resonance generated by the first vibration diaphragm 6311, the second vibration diaphragm 6312, and the first mass block 6321, the second mass block 6322 together with the external vibration signals may be transmitted to an acoustic sensor 620 through the tube 611, thereby achieving the process of transforming vibration signals after being strengthened in one or more target frequency bands into electrical signals. It should be noted that the two groups of vibration diaphragms and mass blocks shown in FIG. 6 is only for the purpose of illustration, which will not limit the protection scope of the present disclosure. For example, there may be one group, three groups or other number of groups of vibration diaphragms and mass blocks.

In some embodiments of the present disclosure, a sound input device may further be provided, which includes the vibration sensor in the above embodiments. The sound may be picked up by the vibration sensor and transformed into electrical signals for further processing.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±1%, ±5%, ±10%, or ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A vibration sensor, comprising:
an acoustic transducer;
a vibration assembly connected with the acoustic transducer, the vibration assembly being configured to transmit an external vibration signal to the acoustic transducer to generate an electric signal, the vibration assembly including one or more groups of vibration diaphragms and mass blocks, each group of the one or more groups including a vibration diaphragm and a mass block, the mass blocks being physically connected with the vibration diaphragms;
the vibration assembly being configured to make a sensitivity degree of the vibration sensor greater than a sensitivity degree of the acoustic transducer in one or more target frequency bands, wherein the one or more groups of vibration diaphragms and mass blocks are arranged in order in a vibration direction of the vibration diaphragms; a distance between adjacent vibration diaphragms in the vibration assembly is no less than a maximum amplitude of the adjacent vibration diaphragms.

2. The vibration sensor of claim 1, wherein a projection area of the mass blocks is located within a projection area of the vibration diaphragms in a vibration direction of the vibration diaphragms.

3. The vibration sensor of claim 1, wherein each group of the one or more groups of vibration diaphragms and mass blocks corresponds to one of the one or more different target frequency bands, so that the sensitivity degree of the vibration sensor is greater than the sensitivity degree of the acoustic transducer in the corresponding target band.

4. The vibration sensor of claim 3, wherein resonance frequencies of the one or more groups of vibration diaphragms and mass blocks are smaller than a resonance frequency of the vibration sensor, so that the sensitivity degree of the vibration sensor is greater than the sensitivity degree of the acoustic transducer in the one or more target frequency bands.

5. The vibration sensor of claim 4, wherein a difference between one of the resonance frequencies of the one or more groups of vibration diaphragms and mass blocks and the resonance frequency of the acoustic transducer is in 1 kHz~10 kHz.

6. The vibration sensor of claim 3, wherein the one or more groups of vibration diaphragms and mass blocks includes a plurality of groups of vibration diaphragms and mass blocks, and resonance frequencies of at least two groups plurality of groups of vibration diaphragms and mass blocks are different.

7. The vibration sensor of claim 6, wherein among resonance frequencies of the plurality of groups of vibration diaphragms and mass blocks, a difference between two adjacent resonance frequencies is smaller than 2 kHz or is not greater than 1 kHz.

8. The vibration sensor of claim 3, wherein resonance frequencies of the one and more groups of vibration diaphragms and mass blocks are within 1 kHz and 10 kHz or within 1 kHz and 5 kHz.

9. The vibration sensor of claim 1, wherein the vibration assembly further includes a supporting structure configured to support the one or more groups of vibration diaphragms and mass blocks, the supporting structure is physically connected with the acoustic transducer, and the one or more groups of vibration diaphragms and mass blocks are connected with the supporting structure.

10. The vibration sensor of claim 9, wherein the supporting structure is made of an airtight material.

11. The vibration sensor of claim 9, wherein,
for each mass block of the one or more groups of vibration diaphragms and mass blocks, in a direction perpendicular to a surface of a vibration diaphragm connected with the mass block, a projected area of the mass block does not overlap with a projected area of the supporting structure.

12. The vibration sensor of claim 1, wherein
the mass blocks are concentric with the vibration diaphragms.

13. The vibration sensor of claim 1, wherein the vibration diaphragms are constructed to let air through.

14. The vibration sensor of claim 13, wherein the vibration diaphragms are provided with through holes or include a breathable diaphragm.

15. The vibration sensor of claim 13, wherein among the vibration diaphragms, a vibration diaphragm furthest from the acoustic transducer is constructed so that no air can pass through.

16. The vibration sensor of claim 1, wherein the vibration assembly further includes a limit structure; the limit structure is configured to make a distance between adjacent vibration diaphragms in the vibration assembly not less than the maximum amplitude of the adjacent vibration diaphragms.

17. The vibration sensor of claim 1, wherein the acoustic transducer is an air conduction microphone;
resonance frequencies of the one or more groups of vibration diaphragms and mass blocks are configured to be 1 kHz~10 kHz lower than the resonance frequency of the air conduction microphone.

18. The vibration sensor of claim 17, wherein the air conduction microphone includes a sound pickup hole, the one or more groups of vibration diaphragms and mass blocks are arranged in the sound pickup hole parallel to a radial section of the sound pickup hole; or
outside of the sound pickup hole.

19. The vibration sensor of claim 18, wherein the mass blocks do not contact an inner wall of the sound pickup hole.

20. A sound input device, comprising a vibration sensor, wherein the vibration sensor includes:
an acoustic transducer;
a vibration assembly connected with the acoustic transducer, the vibration assembly being configured to transmit an external vibration signal to the acoustic transducer to generate an electric signal, the vibration assembly including one or more groups of vibration diaphragms and mass blocks, each group of the one or more groups including a vibration diaphragm and a mass block, the mass blocks being physically connected with the vibration diaphragms;
the vibration assembly being configured to make a sensitivity degree of the vibration sensor greater than a sensitivity degree of the acoustic transducer in one or more target frequency bands, wherein the one or more groups of vibration diaphragms and mass blocks are arranged in order in a vibration direction of the vibration diaphragms; a distance between adjacent vibration diaphragms in the vibration assembly is no less than a maximum amplitude of the adjacent vibration diaphragms.

* * * * *